(12) United States Patent
Falik et al.

(10) Patent No.: US 6,173,355 B1
(45) Date of Patent: Jan. 9, 2001

(54) SYSTEM FOR SENDING AND RECEIVING DATA ON A UNIVERSAL SERIAL BUS (USB) USING A MEMORY SHARED AMONG A NUMBER OF ENDPOINTS

(75) Inventors: Ohad Falik, Sunnyvale, CA (US); David Brief, Ra'anana (IL)

(73) Assignee: National Semiconductor Corporation, Santa Clara, CA (US)

( * ) Notice: Under 35 U.S.C. 154(b), the term of this patent shall be extended for 0 days.

(21) Appl. No.: 09/469,663

(22) Filed: Dec. 22, 1999

Related U.S. Application Data

(62) Division of application No. 09/004,003, filed on Jan. 7, 1998.

(51) Int. Cl.[7] ..................................................... G06F 13/14
(52) U.S. Cl. .............................. 710/129; 709/230; 714/4; 714/799; 370/464
(58) Field of Search ........................... 710/129; 709/230; 714/4, 799; 370/464

(56) References Cited

U.S. PATENT DOCUMENTS

| | | | |
|---|---|---|---|
| 4,737,957 | * | 4/1988 | Nohmi et al. ............................ 714/4 |
| 4,858,112 | * | 8/1989 | Puerzer et al. ........................ 709/230 |
| 5,058,110 | * | 10/1991 | Beach et al. ........................... 370/464 |
| 5,406,322 | * | 4/1995 | Port et al. .............................. 348/15 |
| 5,438,575 | * | 8/1995 | Bertrand ............................... 714/799 |

OTHER PUBLICATIONS

*USB Feature Specification: Shared Endpoints; SystemSoft Corporation, Intel Corporation; pp. i–iii, 1–14; Dec. 4, 1997.
*Universal Serial Bus Common Class Specification; SystemSoft Corporation, Intel Corp.; pp. 1–v, 1–14; Nov. 4, 1997.
*Universal Serial Bus Specification; Compaq, Digital Equipment Corporation, IBM PC Company, Intel, Microsoft, NEC, Northern Telecom; pp. 1–268; Jan. 15, 1996.
*8x930Ax, 8x930Hx Users Manual; Intel; pp. 6.1–10.1 Appendix B–D; 1997.

* cited by examiner

*Primary Examiner*—Thomas C. Lee
*Assistant Examiner*—Abdelmoniem Elamin
(74) *Attorney, Agent, or Firm*—Limbach & Limbach, LLP

(57) ABSTRACT

An apparatus for an method of sending and receiving data on a Universal Serial Bus using a memory shared among a number of end points are disclosed. The memory is a double buffer which allows the next packet to be prepared while the current packet is being transmitted. The invention also supports transmission retry.

23 Claims, 4 Drawing Sheets

SYSTEM FOR SENDING AND RECEIVING DATA ON A UNIVERSAL SERIAL BUS (USB) USING A MEMORY SHARED AMONG A NUMBER OF ENDPOINTS

This application is a divisional of co-pending application Ser. No. 09/004,003, filed on Jan. 7, 1998.

BACKGROUND OF THE INVENTION

1. Field of the Invention

The present invention relates to the Universal Serial Bus (USB) protocol. In particular, the invention relates to the use of a shared buffer for sending and receiving data.

2. Description of the Related Art

Universal Serial Bus (USB) is a standard peripheral interface for attaching personal computers to a wide variety of devices: e.g., digital telephone lines, monitors, modems, mice, printers, scanners, game controllers, keyboards, and other peripherals. The USB thus replaces existing interfaces such as the RS-232C serial ports, parallel ports, PS/2 interfaces, and game/MIDI ports.

In accordance with USB, all attached devices connect to a personal computer through a single connector type using a tiered-star topology. A host personal computer includes a single USB controller. The host controller provides the interface between the USB network and the host personal computer. The host controller controls all accesses to USB resources and monitors the bus's topology. A USB hub provides USB attachment points for USB devices.

A USB function is a USB device that is able to transmit and receive information on the bus. A function may have one, or more, configurations, each of which defines the interfaces that make up the device. Each interface, in turn, is made up of one of more end points.

An endpoint is the ultimate source, or sink, of data. An endpoint pipe provides for the movement of data between USB and memory, and completes the path between the USB host and the function endpoint.

Each endpoint is an addressable entity on USB and is required to respond to IN and OUT tokens from the USB host (typically a PC). IN tokens indicate that the host has requested to receive information from an endpoint, and OUT tokens indicate that the host is about to send information to an endpoint.

On detection of an IN token addressed to an endpoint, the endpoint is responsible for responding with a data packet. If the endpoint is currently stalled, a STALL handshake packet is sent. If the endpoint is enabled, but no data is present, a negative acknowledgment (NAK) handshake packet is sent.

Similarly, on detection of an OUT token addressed to an endpoint, the endpoint is responsible for receiving a data packet sent by the host and storing it in a buffer. If the endpoint pipe is currently stalled, at the end of the data transmission, a STALL handshake packet is sent. If the endpoint pipe is currently disabled, at the end of the data transmission, no handshake packet is sent. If the endpoint pipe is enabled, but no buffer is present in which to store the data, a NAK handshake packet is sent.

A disabled endpoint, or endpoints not currently mapped to an endpoint pipe, do not respond to IN, OUT, or SETUP tokens.

A number of vendors have developed implementations of the USB standard. For example, Intel Corp. has released the 8x931Ax, 8x931Hx, 8x930Ax, and 8x930Hx devices.

However, these devices have a number of limitations. The 8x930 and 8x931 have a transmit buffer and a receive buffer dedicated to each endpoint pair. Thus the number of endpoints can constrain the size of the buffers, or vice versa. There is a need to increase the number of endpoints without a corresponding increase in total buffer size.

In addition, after receiving data, the 8x930 and 8x931 require processor intervention to remove the data from the buffer before it becomes full. There is a need to reduce processor intervention after receiving data.

SUMMARY OF THE INVENTION

The present invention addresses these and other problems by providing a buffer that can be shared among a number of endpoints.

According to one embodiment, an apparatus for sending data from a USB endpoint to a USB host according to the present invention includes a first memory, a second memory, a data processor, a pointer memory, and a controller. The data processor is configured to generate at least a first data packet of data in the first memory and a second data packet of the data in the second memory. The pointer memory is configured to contain a pointer corresponding to a memory. The controller is configured to send a data packet from a USB endpoint to a USB host on a USB endpoint pipe, and to receive a signal. The data processor generates a first data packet in the first memory and a second data packet in the second memory. The controller generates in the pointer memory a pointer to the first memory, sends the data packet pointed to by the pointer, then waits for an acknowledgement signal from the host. If the controller does not receive the signal, it resends the data packet. If the controller does receive the signal, it generates in the pointer memory a second pointer to the second memory and sends the data packet pointed to by the pointer.

According to a further embodiment, after the signal is received, the data processor generates a third data packet of the data in the first memory. After the controller receives the signal and sends the second data packet, the controller then waits for a second acknowledgement signal. If the controller does not receive the second signal, it resends the second data packet. If the controller does receive the signal, it generates in the pointer memory a third pointer to the first memory and sends the data packet pointed to by the pointer.

According to another embodiment, an apparatus for receiving data from a USB host includes a first memory, a second memory, a data processor, a pointer memory, and a controller. The data processor is configured to generate data from at least a first data packet in the first memory. The pointer memory is configured to contain a pointer corresponding to a memory. The controller is configured to receive a data packet at a USB endpoint from a USB host on a USB endpoint pipe, and to detect an error. The controller generates in the pointer memory a first pointer to the first memory, receives the first data packet into the memory pointed to by the pointer, then detects whether a first error occurred. If the error is detected, the controller continues receiving. If the error is not detected, the data processor generates the data from the first data packet, and the controller generates a second pointer to the second memory and receives a second data packet into the memory pointed to by the pointer.

According to a further embodiment, after the second data packet is received, the controller detects whether a second error occurred. If the second error is detected, the controller continues receiving. If the second error is not detected, the data processor generates the data from the second data packet, and the controller generates a third pointer to the first memory and receives a third data packet into the memory pointed to by the pointer.

According to yet another embodiment, a method of sending data from a USB endpoint to a USB host according to the present invention includes the steps of generating a first data packet of the data in a first memory, generating a second data packet of the data in a second memory, generating a first pointer to the first memory, and sending the data packet pointed to by the pointer from the USB endpoint to the USB host. Then, the method further includes the steps of waiting for an acknowledgement signal from the host and continuing to send the data packet if the signal is not received. The method further includes, once the signal is received, the steps of generating a second pointer to the second memory, then sending the data packet pointed to by the pointer.

According to a further embodiment, after the signal is received, the method further includes the step of generating a third data packet of the data in the first memory. After the steps of receiving the signal and sending the data packet, the method further includes the steps of waiting for a second acknowledgement signal from the host and continuing to send the second data packet if the second signal is not received. The method further includes, once the second signal is received, the steps of generating a third pointer to the first memory, then sending the data packet pointed to by the pointer.

According to still another embodiment, a method of receiving data at a USB endpoint from a USB host according to the present invention includes the steps of generating a first pointer to a first memory, and receiving a first data packet into the first memory. The method further includes the steps of detecting an error and continuing to receive the first data packet until the error is not detected, then generating data from the first data packet. The method further includes, once the error is not detected, the steps of generating a second pointer to the second memory, then receiving the second data packet into the memory pointed to by the second pointer.

According to a further embodiment, after the second data packet is received, the method further includes the steps of detecting a second error and continuing to receive the second data packet until the second error is not detected, then generating data from the second data packet. The method further includes, once the second error is not detected, the steps of generating a third pointer to the first memory, then receiving the third data packet into the memory pointed to by the third pointer.

A better understanding of the features and advantages of the present invention will be obtained by reference to the following detailed description and accompanying drawings which set forth illustrative embodiments in which the principles of the invention are utilized.

DETAILED DESCRIPTION OF THE PREFERRED EMBODIMENTS

The invention described in this application is an aspect of a larger set of inventions described in the following co-pending applications which are commonly owned by the assignee of the present invention, and are hereby incorporated by reference: U.S. patent application Ser. No. 09/003,897 now pending, U.S. patent application Ser. No. 09/004,004 now pending, U.S. patent application Ser. No. 09/003,963 now U.S. Pat. No. 6,070,208, U.S. patent application Ser. No. 09/004,002 now pending, U.S. patent application Ser. No. 09/004,005 now pending, and U.S. patent application Ser. No. 09/003,925 now pending.

General Description of the Invention

Figure 1:
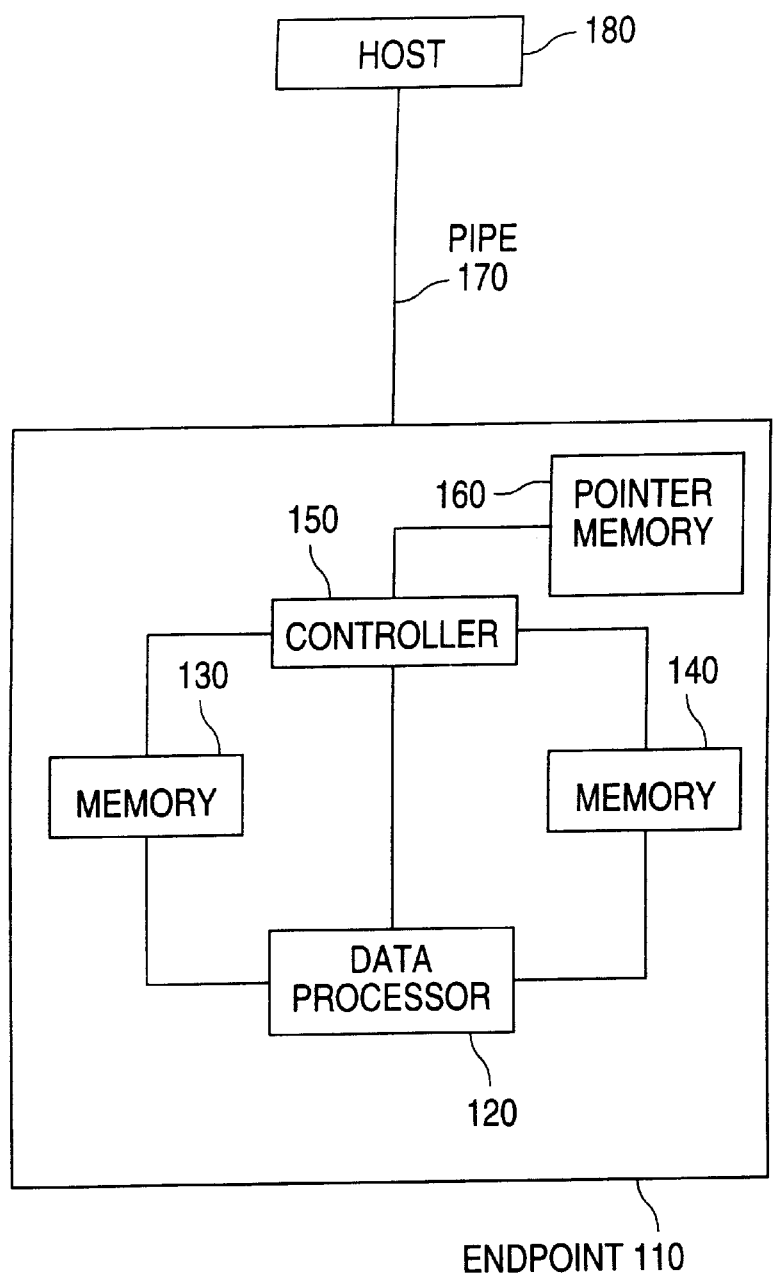
FIG. 1 is a block diagram showing the structure of an embodiment of the present invention.

FIG. 1 illustrates a general embodiment of one aspect of the present invention. FIG. 1 shows an endpoint 110, a data processor 120, a first memory 130, a second memory 140, a controller 150, a pointer memory 160, an endpoint pipe 170, and a host 180. Data processor 120 processes the data into data packets in memory 130 and memory 140. Controller 150 controls the flow of data packets on endpoint pipe 170. Memory 160 holds a pointer to memory 130 or memory 140. Host 180 lies at the other end of endpoint pipe 170 and exchanges data packets with endpoint 110.

The structure illustrated in FIG. 1 can be configured to perform the following methods as illustrated in FIGS. 2–5.

Figure 2:
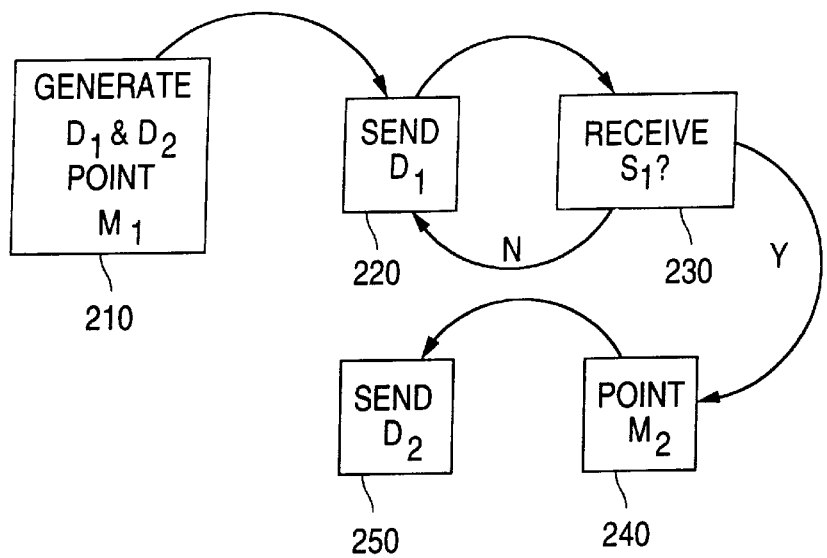
FIG. 2 is a state diagram showing the operation of a data transmission embodiment of the present invention.

FIG. 2 illustrates a state diagram of a method for sending data packets from the endpoint to the host. FIG. 2 shows a pointing and generating state 210, a sending state 220, a receiving state 230, a pointing state 240, and a second sending state 250.

Figure 3:
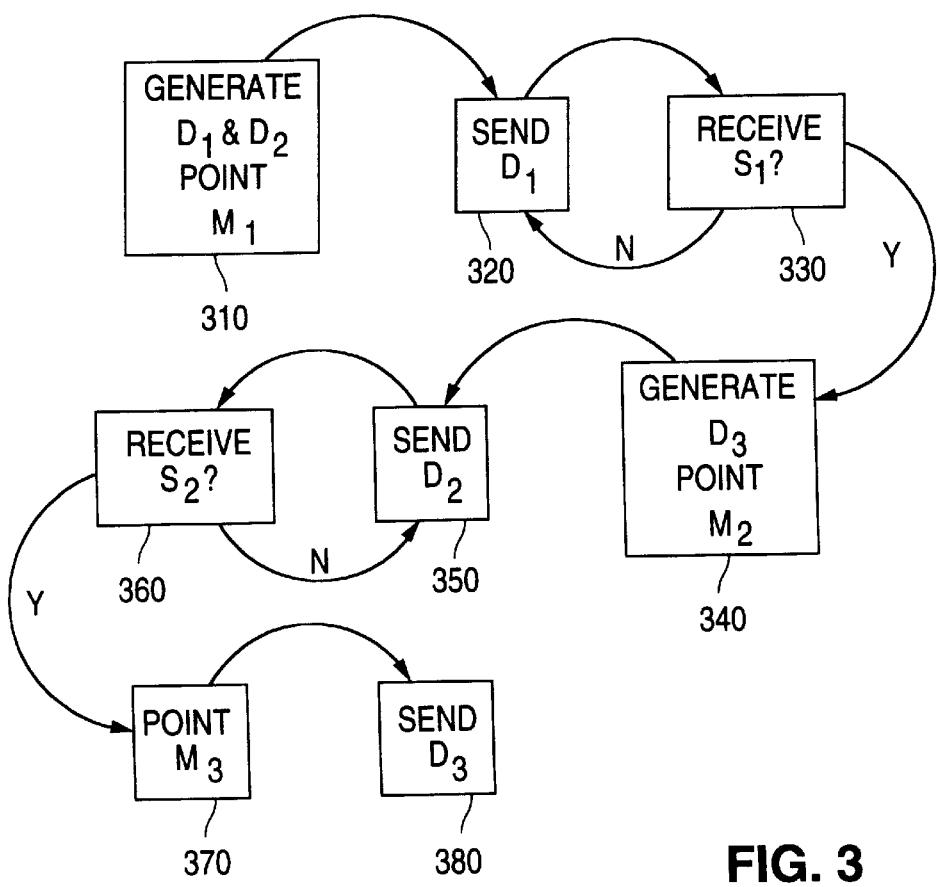
FIG. 3 is a state diagram showing the operation of another data transmission embodiment of the present invention.

FIG. 3 illustrates how the method shown in FIG. 2 can include further steps. FIG. 3 shows a pointing and generating state 310, a sending state 320, a receiving state 330, a second pointing and generating state 340, a second sending state 350, a second receiving state 360, a pointing state 370, and a third sending state 380.

Figure 4:
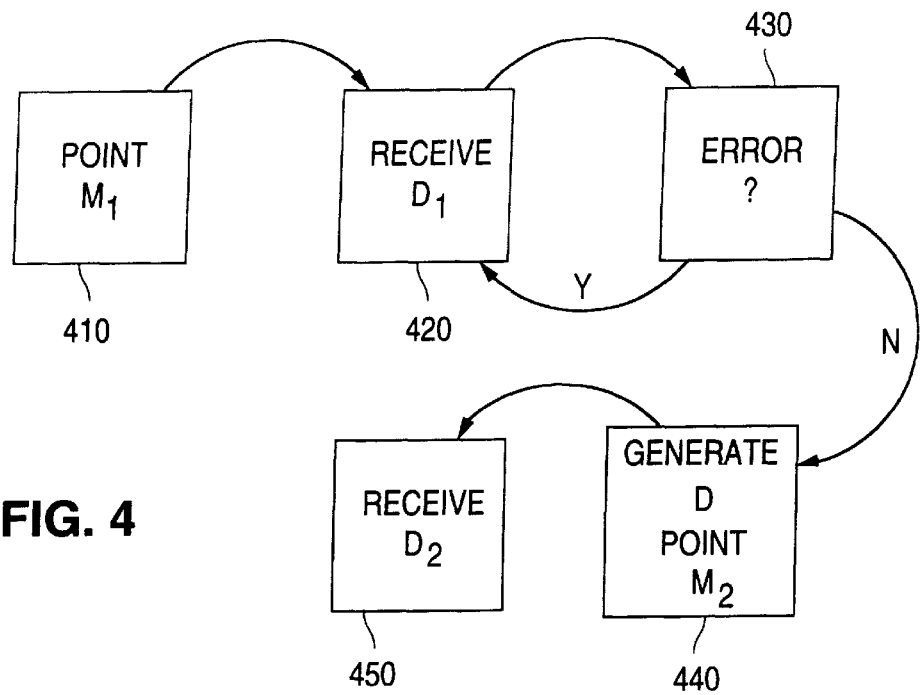
FIG. 4 is a state diagram showing the operation of a data reception embodiment of the present invention.

FIG. 4 illustrates a state diagram of a method for receiving data packets at the endpoint from the host. FIG. 4 shows a pointing state 410, a receiving state 420, a determining state 430, a pointing and generating state 440, and a second receiving state 450.

Figure 5:
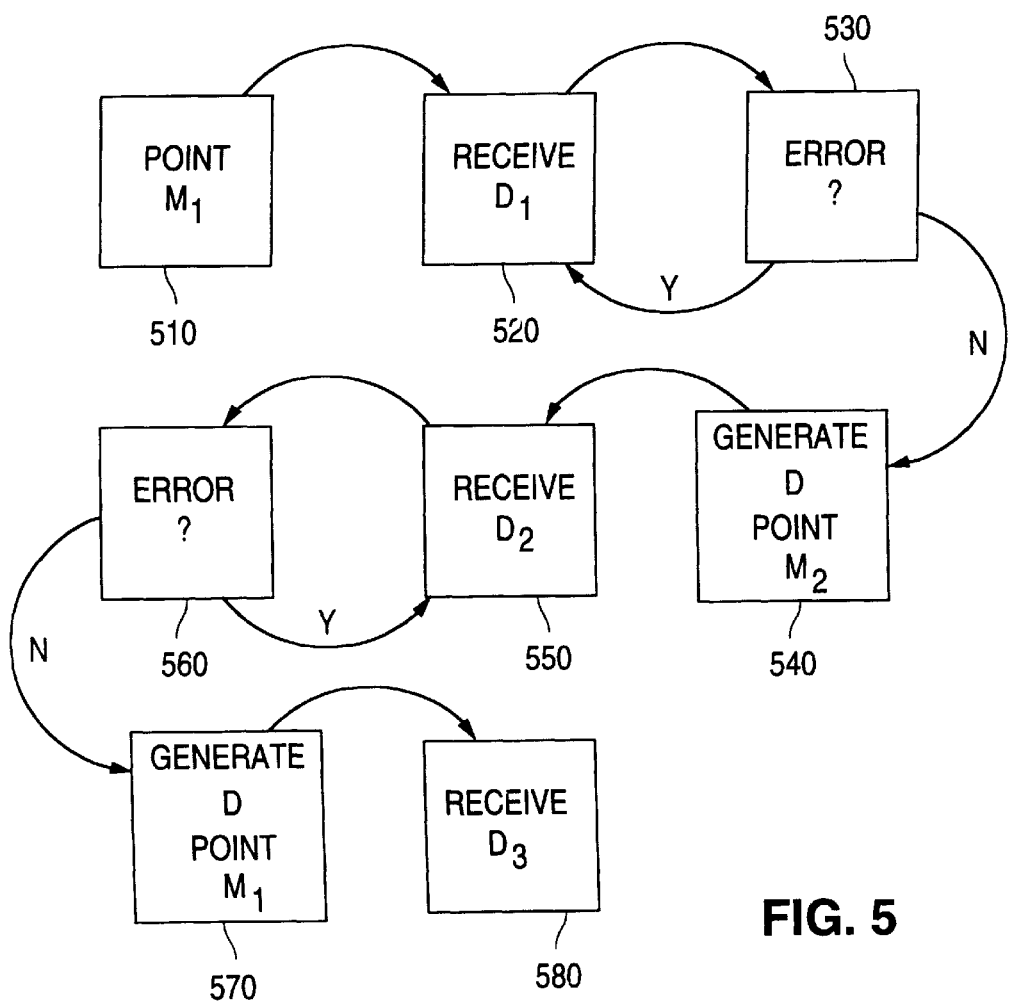
FIG. 5 is a state diagram showing the operation of another data reception embodiment of the present invention.

FIG. 5 illustrates how the method shown in FIG. 4 can include further steps. FIG. 5 shows a pointing state 510, a receiving state 520, a determining state 530, a pointing and generating state 540, a second receiving state 550, a second determining state 560, a second pointing and generating state 570, and a third receiving state 580.

The invention as shown in FIGS. 1 and 2 operates as follows. In state 210, data processor 120 generates, from data in endpoint 110, at least one data packet in memory 130 and at least another data packet in memory 140, and controller 150 causes the pointer stored in memory 160 to point to memory 130. In state 220, controller 150 sends the data packet in the memory pointed to by the pointer in memory 160 on the endpoint pipe 170 to host 180. In state 230, controller 150 either receives an acknowledgement signal from the host within a timeout period or it goes back to state 220 to resend the data packet. In state 240, host 180 did send the acknowledgement, so controller 150 causes the pointer to point to memory 140. In state 250, controller 150 sends the data packet in the memory pointed to by the pointer to host 180.

Although this specification uses the term "data packet", the invention is also intended to apply to a plurality of data even if the data is not contained in a discrete packet.

The invention as shown in FIGS. 1 and 3 operates as follows. States 310–350 correspond to states 210–250, respectively, with the following addition. In state 340, data processor 120 generates at least a third data packet in memory 130 from data in endpoint 110. In state 360, controller 150 either receives an acknowledgement signal from the host within the timeout period or it goes back to state 350 to resend the data packet. In state 370, host 180 did send the acknowledgement, so controller 150 causes the pointer to point to memory 130. In state 380, controller 150 sends the data packet in the memory pointed to by the pointer to host 180.

The invention as shown in FIGS. 1 and 4 operates as follows. In state 410, controller 150 causes the pointer stored in memory 160 to point to memory 130. In state 420, controller 150 receives the first data packet from host 180 into the memory pointed to by the pointer. In state 430, controller 150 either determines there was no error in the first data packet or it goes back to state 420 to re-receive the first data packet. In state 440, there was no error, so controller 150 causes the pointer to point to memory 140, and generates data at the endpoint 110 from the first data packet. In state 450, controller 150 receives the second data packet from host 180 into the memory pointed to by the pointer.

The invention as shown in FIGS. 1 and 5 operates as follows. States 510–550 correspond to states 410–450, respectively. In state 560, controller 150 either determines there was no error in the second data packet or it goes back to state 550 to re-receive the second data packet. In state 570, there was no error, so controller 150 causes the pointer to point to memory 130, and generates data at the endpoint 110 from the second data packet. In state 580, controller 150 receives the third data packet from host 180 into the memory pointed to by the pointer.

Although this specification uses the term "memory", the invention is also intended to apply to other types of data storage elements.

This general description is further detailed in the following section, which illustrates preferred embodiments of the aspects of the present invention.

Preferred Embodiments of the Invention

In a preferred embodiment, the invention described above is implemented as parts of a USB node interface module (UNIM). Parts of the UNIM relevant to the invention of the present application include an endpoint controller, serial interface engine, an endpoint pipe controller, a control word, various registers, a state diagram, and bulk endpoint operation.

Endpoint Controller

In a preferred embodiment, the endpoint controller handles the endpoint related operations including endpoint pipe state, buffering and transfers. In a preferred embodiment, up to 16 endpoint pipes (and their corresponding endpoints) can be supported at any given time. Each endpoint pipe can be allocated up to two buffers, in the core bus address space, that are used for receive and transmit operations. If no buffers are allocated to an endpoint pipe, the controller is responsible for providing appropriate handshakes for input tokens and output tokens.

The endpoint controller includes several functional blocks. The endpoint state machine provides the centralized control for the utility blocks of the data alignment multiplexer (DALM), the address generator (ADGen), and the partial endpoint pipe (PEP) storage. Device functions such as address checking and generation are accomplished in the device function block. In a preferred embodiment, all the state machines run on a 12 MHz USB clock. All data transfers work on a core bus clock. Parts of the ADGen block, and all the DALM block, operate using the core bus clock. All other blocks of the endpoint controller use the local 12 MHz clock exclusively. Data bytes between the domains are synchronized at the MAC user interface with an asynchronous handshake for each transferred byte.

In a preferred embodiment, the endpoint controller minimizes the number of memory accesses required. Only on reception of a token is a memory access required to the endpoint array. A single double-word access, together with the resident endpoint state, is sufficient to allow the endpoint pipe to process the host request. This access reads the location and size information for the data transfer. The data transfer occurs in successive double-word read or write operations. The module has the highest priority on the core bus for transfers, and the transfer rate is considerably higher than that of USB. Thus, there is a minimal requirement for data buffering within the endpoint controller, aside from an extra word to overlap subsequent accesses with the current one.

A byte counter keeps track of the number of bytes that are transferred. The last access of a transfer may require a partial read or write of memory. The partial write of the last access is determined by the final byte count.

At the end of a transfer, the current control word is written with status for the transfer, and the other control word for this endpoint is read to check to see if another buffer was prepared. After the control word operations, the endpoint pipe state is updated.

Through a combination of hardware and software, the UNIM supports all three USB defined synchronization classes, Asynchronous, Synchronous and Adaptive. The endpoint controller provides hardware assistance for monitoring the USB 1 KHz bus clock relative to an external reference such as an 8 KHz reference, and for monitoring the quality and consistency of the USB 1 KHz bus clock. Rising edges of an external reference clock are counted in the reference count register. This can be used to compare to the USB frame number. The difference in frequency between the reference clock and the USB clock can be signaled in packets to the host, such that the host can adjust the USB bus clock frequency; thus the USB reference can be locked to the reference clock.

The endpoint controller also maintains status to indicate when it is locked to the USB 1 KHz bus clock, and when a discontinuity occurs in the USB bus clock due to a missing or incorrect Start_Of_Frame packet. This is used by the software to adjust the queuing of isochronous packets. The current frame number is used by the endpoint controller to determine which isochronous buffer to transmit next.

Serial Interface Engine

In a preferred embodiment, the USB Serial Interface Engine (SIE) is comprised of a PHY and a MAC level. The PHY level includes the digital-clock recovery circuit, a digital glitch filter, End_Of_Packet detection circuitry, and bit-stuffing and de-stuffing logic. The MAC level includes packet formatting, CRC generation and checking, and endpoint address detection, and provides the necessary control to give the NAK, ACK and STALL responses as determined by the EPC for the specified endpoint pipe. The SIE is also responsible for detecting and reporting events on detection of USB-specific events, such as Reset, Suspend and Resume. The transmitter outputs of the UNIM module to the transceiver are well matched (under 1 ns) to minimize skew on the USB signals.

Endpoint Pipe Controller

In a preferred embodiment, the endpoint pipe controller (EPC) provides the interface for USB function endpoints. In a preferred embodiment, up to 16 such endpoint pipes can be supported at any given time, each with the same function address. The EPC maintains separate state information for each endpoint pipe.

State information required for immediate decisions (such as responding with a NAK or STALL handshake) is kept within the module at all times for each endpoint pipe. Other information necessary for endpoint operation is kept in an endpoint array in memory. In a preferred embodiment, only one endpoint pipe is active at any given time, allowing the double buffer and the endpoint pipe state machine to be shared among all endpoint pipes.

For IN tokens, the EPC is responsible for transferring data from the defined buffer to the host. For OUT tokens, the EPC is responsible for transferring data from the host to the defined buffer. To allow more flexibility when assigning buffers to an endpoint pipe, in a preferred embodiment a double buffering scheme is permitted on each endpoint pipe. This allows the EPC to provide a prompt response to all transactions to this module without resorting to NAKs.

For OUT transfers, if the toggle number in packet identifier PID (i.e., 0 for DATA0, and 1 for DATA1) does not match the current control word pointer CWP, data is not transferred to memory. If the buffer state is OCMP or ORDY then send an ACK at the end of the transfer anyway and do not update the CWP.

A new endpoint pipe (EPP) state can be defined for missing acknowledge I_MAK. This state can be entered from the I_ACT state if this is a command EPP when the host did not respond with an ACK or when the host's ACK was corrupted on its way to the node. In both cases, the buffer status is written to I_WT and CWP is not incremented.

If while in the I_MAK state and an IN token is received, the endpoint will resend the data, as before.

If while in the I_MAK state and an OUT token is received, this then confirms that the previous ACK was corrupted on its way back to the node. The current OUT transaction will be NAKed, the data is ignored (but the I_CMP buffer status is written), CWP is inverted, and the control word is read, which in turn causes the endpoint state to be updated (the normal status processing). This buffer status should be either O_RDY or SKIP.

If the buffer status is O_RDY then the next data packet will be received as in normal operation. If the buffer status is SKIP then another NAK will be sent. Data is resent at the current CWP.

In a preferred embodiment, all information used by endpoint pipes during data transfers is maintained in the endpoint array, which is located in RAM. This array is indexed, by endpoint pipe, from the base defined in the endpoint array base address register EABAR. This array contains two double-words per endpoint. Each double word is a control word that contains command and status information for the endpoint pipe, such as a pointer to the beginning of the buffer, the size of the buffer, the state of the buffer, and other relevant parameters.

The buffer state defines if the buffer is to be used for input or output transactions, and whether it is currently being accessed or has completed the desired operation.

When an IN or OUT transfer is requested of an endpoint pipe with a buffer present, the appropriate control word is read. This control word tells the endpoint controller how to complete the transaction. At the end of a transaction, the control word is written with status which is used by software as an indication to release this buffer and provide a new one.

Control Word

In a preferred embodiment, the endpoint pipe array contains 32 control words, two for each endpoint pipe. The endpoint pipe array is located in memory in an address pointed by an endpoint array base address register EABAR. This address must be 128-byte aligned (i.e., the 7 LSBs of the address are 0). The endpoint pipe array is indexed by the 4-bit endpoint pipe number EPN, and the control word accessed is determined by the 1-bit endpoint pipe control word pointer CWP. Together the 25-bit EABAR, 4-bit EPN, and one bit CW generate a 32-bit address aligned to a double-word (32-bit) boundary, and are used to access the 32-bit control word.

The 32-bit control word contains all the information required to operate this endpoint pipe, when active. There are two such entries for each endpoint pipe. The control word to be accessed next is determined by the endpoint pipe control word pointer CWP value. Immediately after a IN, OUT or SETUP token is received to an endpoint pipe currently in a ready state, the control word of the selected endpoint pipe at the current control word pointer is read to determine how to respond to the token. At the end of a transfer, when completion status is written, the control word is updated with the current status, the CWP is incremented, and the other control word is read. When intermediate status is written, only the most significant byte of the control word is updated. The control word format is shown below:

| Bits | Function Label |
| --- | --- |
| 31–28 | Buffer State BS |
| 27 | (Reserved) |
| 26–16 | Buffer Address BA |
| 15 | Buffer Page BP |
| 14 | Buffer Rounding BR |
| 13 | Toggle Enable TE |
| 12 | Type Isochronous TI |
| 11 | Interrupt on Packet Complete IC |
| 10 | Interrupt on Packet Error IE |
| 9–0 | Byte Count BC |

The 4-bit buffer state BS is one packet of the control word relevant to the invention of the present application. The buffer state is updated by software and the endpoint pipe controller (EPC) to synchronize the control of this buffer between them. EPC writes status indicating the use of the buffer. This field is set by node firmware to Output Ready, Input Ready, Setup Ready, Skip, Stall and Disable. All other values are set by the EPC. The EPC can also write the Stall and disable values in error conditions. The buffer can be reclaimed by node firmware when the buffer state is any of the Complete values; this includes the Input/Output Complete Status and the Error codes.

The buffer state BS can take the following values:
  0: Skip. This value is used together with the Output Ready Command. Skip causes the next data packet received to be ignored and the control word pointer to be incremented. For control endpoints, this also causes the endpoint pipe state to switch from the input/ready state to the output/input Idle state. The setting of TE and TI determines which handshake is returned, and the next state of the endpoint pipe. A NAK is returned if neither TE or TI is set. If TI is set, and not TE, no handshake is returned. If TE is set, an ACK is returned and complete status is written when a packet with the proper PID is received.

1: Input Ready IRDY. This value indicates that the buffer has been written with data to transmit in response to an IN token.

2: Output Ready ORDY. This value indicates that the buffer has been allocated for writing.

3: Setup Ready SRDY. This value indicates that the buffer has been allocated for writing. This is used only on a Control Endpoint during the first transfer of control read and control write operations. Write only in control word 0.

4: Output Wait OWT. This value indicates that an error occurred while receiving OUT data from the host. This includes detection of a bit stuff error. A retry is expected as this is considered intermediate status, except in the case of an isochronous OUT endpoint where it is treated as completion status.

5: CRC Error CRCE. This value indicates that a bad CRC was detected at the end of an OUT transaction. A retry is expected as this is considered intermediate status, except in the case of an isochronous OUT endpoint where it is treated as completion status.

6: Buffer Error BUFE. This value indicates that during an OUT, data was received faster from USB than it could be written to memory. During an IN, data was not read from memory fast enough to keep up with the USB data rate. A retry is expected on this endpoint.

7: Input Wait IWT. This value indicates that the buffer is being held by the endpoint controller and is waiting to try, or retry, to transmit this buffer at the next opportunity. This occurs in the case of a missed acknowledge.

8: Input Complete ICMP. This value indicates successful completion of this input operation. The buffer may be released.

9: Output Complete OCMP. This value indicates that the buffer is full of data and no error was detected.

10: Token Error TKNE. This value indicates that a token of the wrong type for the current context of this control endpoint pipe was received. If this was an output buffer, then the endpoint is halted. If this was an input buffer, a NAK is sent and the state of the other control word is examined. This is considered a completion status.

11: Isochronous Synchronization Error SYNE. This value indicates that data was received into a buffer with TE=1 and TI=1 but CWP was not equal to the LSB of the FNR. This is considered a completion status.

12: Data Error DATE. For OUT data, when CW.BR is not set and the amount of data received from the host was less than expected, or the allocated buffer was not big enough to store the OUT data. For IN data, this is set if a buffering error occurred and CW.TE was not set or CW.TI was set. This is considered a completion status.

13: (Reserved).

14: Halt. Causes the current endpoint pipe to enter its HALT state, or indicates that the endpoint has entered the HALT state.

15: Disable. Causes the current endpoint pipe to enter its DISABLE state or indicates that the endpoint has entered the DISABLE state.

The Toggle Enable bit TE is used to compare and generate the data packet identifier (PID) value (DATA0/DATA1) with the Control Word Pointer, and can take the following values:

0: The data toggle PID is not checked on OUT transactions and is generated based on the current value of CWP in response to IN tokens. The CWP is incremented (inverted) after each transaction, even if an ACK was not received. For Isochronous endpoints, OUT data is not written to memory until CWP is equal to the least significant bit of the frame number, FNR.FN (0). This has no affect in data sent in response to IN tokens. Data toggle should not be enabled for buffers allocated to receive data sent with the SETUP token.

1: The data toggle PID is checked on OUT transactions and is generated based on the current value of the CWP in response to IN tokens. For OUT transactions, this causes an ACK to be sent in response to out packets whose PID value (DATA0/DATA1) does not match CWP. For IN transactions, CWP is incremented (inverted) after each transaction, only if an ACK handshake is returned in the response timeout period. For isochronous endpoints, OUT data is always written to memory but if FNR.FN(0) is not equal to CWP the isochronous synchronization error SYNE buffer state is written back.

For IN transactions, TE allows the transmitted data PID value to be changed even if a valid ACK is not received in the timeout period. This can be important for certain applications of an interrupt IN endpoint.

For OUT transactions, TE can be used to determine whether or not to check the DATA0 or DATA1 PID in deciding to accept the packet. This can be important for an interrupt OUT endpoint where the most recent data should be received.

The buffer rounding bit BR indicates, for output transactions, if it is permissible to have data buffers of different size than the received data packet, and can have the following values:

0: The data packet should exactly fill the defined data buffer. The buffer overrun or underrun status is given if the packet does not exactly fit the buffer.

1: The data packet may be smaller than the defined buffer without causing an error condition on the endpoint.

When read together with an output complete OCMP or data error DATE buffer status, this field indicates the value of the received PID: 0 for DATA0, and 1 for DATA1.

The buffer page bit BP can take the following values:

0: Use buffer page A as the upper address of the input/output buffer.

1: Use buffer page B as the upper address of the input/output buffer.

The buffer address bits BA hold the lower 11 bits of the buffer address. Buffers must start on an aligned double-word boundary and can end on any byte boundary. At the end of all complete transfers, the residual value of the buffer address is written. At the end of incomplete transfers such as when the status is written to input or output wait, this field is not over-written.

For OUT buffers, the first byte stored is the byte following the PID. Similarly for IN buffers, the address points to the first byte of data to be transmitted, i.e., the byte immediately following the PID in the packet. The CRC is automatically calculated and appended to the packet, except when the IN token is received from the IS_RDY state and the control word did not have the IS field set to 1.

The byte count bits BC hold the size of the data buffer to be used. Buffers start on an even double-word boundary, and can end on any byte boundary. For IN transactions, this indicates the size of the data to be transmitted. For OUT transactions, this indicates the size of the buffer in which data can be received. Zero is a legitimate value for the byte count. At the end of all complete transfers, the residual value of the byte counter is written. At the end of incomplete transfers, such as when the status is written to input or output wait, this field is not overwritten.

Registers

In a preferred embodiment, four registers relevant to the invention of the present application are the endpoint command register, the USB data register, the buffer page A register, and the buffer page B register.

In a preferred embodiment, the endpoint command register (ECR) is a word-wide, read/write register. The ECR is used to perform commands on a specified endpoint. Upon reset, this register is cleared. The ECR register format is shown below:

| Bits | Function Label |
| --- | --- |
| 15–8 | (Reserved) |
| 7–4 | Endpoint Pipe Number (EPN) |
| 3–0 | Endpoint Command (CMD) |

The endpoint pipe number EPN determines the endpoint pipe on which the command is performed. In a preferred embodiment, this register can be implemented in the high-speed bus interface logic. The data is passed across the asynchronous interface. Two signals are passed back from the endpoint controller; one to indicate that the command was processed and that the command value should be cleared to "0", and another indicating that the command could not be processed and should be set to "F".

The endpoint command CMD can take the following values:

0000: Complete. This value indicates that the previous command is complete and the endpoint controller is ready to accept another command.

0001: Input Enable (CMD.IENB). This value causes the specified endpoint pipe to enter the Input Idle state I_IDL from the Stall (Halt) or Disable state. The Control Word Pointer for the specified endpoint pipe is reset to 0. If the current state is not Disable or Stall, a "F" is returned to indicate that an illegal command was attempted on this endpoint and the command is ignored.

0010: Input Ready (CMD.IRDY). This value causes the specified endpoint pipe to enter the Input Ready state I_RDY if it is currently in the Input Idle state I_IDL. This command is issued after a control word with an Input Ready buffer state I_RDY is written into the endpoint array for the corresponding endpoint. This command does not cause the control word in memory to be read; instead, it permits it to be read in response to reception of an IN token. If the current state of the endpoint is not Input Idle I_IDL, the command is ignored. If the current state is one of the Output or Setup states or Disable or Stall, a "F" is returned to indicate that an illegal command was attempted on this endpoint.

0011: Input Isochronous Ready (CMD.ISRDY). This value causes the specified endpoint pipe to enter the Input Isochronous Ready state IS_RDY, if it is currently in the Input Idle state I_IDL. This command is issued after a control word with the Input Ready buffer state is written into the endpoint array for the corresponding endpoint. This command does not cause the control word in memory to be read; instead, it permits it to be read in response to reception of an IN token. It is expected that the type field of the control word (TI) is set to isochronous, but this is not checked. If the current state of the endpoint is not Input Idle I_IDL, the command is ignored. If the current state is one of the Output or Setup states or is Disable or Stall, a "F" is returned to indicate that an illegal command was attempted on this endpoint.

0100: Output Enable (CMD.OENB). This value causes the specified endpoint pipe to enter the Output Idle state O_IDL from the Stall or Disable state. The Control Word Pointer for the specified endpoint is reset to 0. If the current state is not Disable or Stall, a "F" is returned to indicate that an illegal command was attempted on this endpoint, and the command is ignored.

0101: Output Ready (CMD.ORDY). This value causes the specified endpoint pipe to enter the Output Ready state O_RDY if it is currently in the Output Idle state O_IDL. This command is issued after a control word with an Output Ready state is written into the Endpoint Array for the corresponding endpoint. This command does not cause the control word in memory to be read; instead, it permits it to be read in response to reception of an OUT token. If the current state of the endpoint is not Output Idle the command is ignored. If the current state is one of the Input states, Stall, or Disable, then a "F" is returned to indicate that an illegal command was attempted on this endpoint.

0110: Output Isochronous Enable (CMD.OSENB). This value causes the specified endpoint pipe to enter the Output Isochronous Idle state OS_IDL from the Stall or Disable state. The Control Word Pointer for the specified endpoint is reset to 0. If the current state is not Disable or Stall, a "F" is returned to indicate that an illegal command was attempted on this endpoint, and the command is ignored.

0111: Output Isochronous Ready (CMD.OSRDY). This value causes the specified endpoint pipe to enter the Output Isochronous Ready state OS_RDY, if it is currently in the Output Isochronous Idle state OS_IDL. This command is issued after a control word with an Output Ready state is written into the Endpoint Array for the corresponding endpoint. This command does not cause the control word in memory to be read; instead, it permits it to be read in response to reception of an OUT token. If the current state of the endpoint is not Output Isochronous Idle the command is ignored. If the current state is one of the Input states, Stall, or Disable, then a "F" is returned to indicate that an illegal command was attempted on this endpoint.

1000: Setup Ready (CMD.SRDY). This value causes the specified endpoint pipe to enter the Setup Ready state S_RDY. This command is issued after a control word with an Output Ready state is written into the Endpoint Array for the corresponding endpoint. This command does not cause the control word in memory to be read; instead, it permits it to be read in response to reception of a SETUP token. If the current state of the endpoint is not Stall or Disable, the command is ignored.

1001: Disable (CMD.DISAB). This value causes the specified endpoint pipe to enter the disabled state DISABLE. This occurs immediately from any state. If the endpoint pipe is currently active, status is written in the control indicating that the endpoint was disabled.

1010: Stall (CMD.HALT). This value causes the specified endpoint to enter the Stall state HALT from any state. This occurs immediately from any state. If the endpoint pipe is currently active, status is written in the control indicating that the endpoint was stalled.

1011–1101: Reserved. These values cause no action to be performed, and return 0.

1110: Toggle CWP. This value causes the Control Word Pointer to be toggled. This is used with control transfers with an odd number of packets sent or received during the data phase.

1111: Error. This value indicates that an illegal command was attempted on the current endpoint pipe for its current state, and that a new command may be accepted.

In a preferred embodiment, the USB Data Register (UDR) is a word-wide, read/write register. Read accesses are permitted in all locations. The data register is loaded with the data read for the register selected by a USB index register (UIR) at all times. Writes of this register are permitted only in the USB Hub Registers when the selector bits of the UIR (UIR.SEL) have a value of 2. A status bit is defined in bit 15 of UIR to indicate that a write operation has been successful. This is necessary only when the Hub Functionality is included.

The part of the UDR relevant to the invention of the present application is the 8-bit endpoint pipe state. This state is stored for each endpoint pipe that is returned for the currently indexed endpoint pipe. If an invalid endpoint pipe is indexed, 0 is returned. The UDR register format is shown below:

| Bits | Function Label |
| --- | --- |
| 7 | Control (CTL) |
| 6 | Control Word Pointer (CWP) |
| 5–4 | (Reserved) |
| 3–0 | Endpoint Pipe State (EPS) |

Control CTL: This is asserted if this endpoint pipe is capable of accepting control sequences involving the SETUP token. This bit is set after CMD.SRDY for this endpoint pipe is performed and remains set until the endpoint is Disabled.

Control Word Pointer CWP: When the control word bit is 0, control word 0 of this endpoint in the endpoint array is accessed next. When the control word bit is 1, control word 1 for this endpoint is accessed next. This is set to 0 whenever the endpoint is enabled.

The endpoint pipe state EPS can take the following values:

| Value | State |
| --- | --- |
| 0 | Disabled DIS |
| 1 | Input Idle I_IDL |
| 2 | Input Ready I_RDY |
| 3 | Input Active I_ACT |
| 4 | Stalled HALT |
| 5 | Input Missed ACK I_MAK |
| 6 | Input Isochronous Ready IS_RDY |
| 7 | Input Isochronous Active IS_ACT |
| 8 | Setup Ready S_RDY |
| 9 | Output Idle O_IDL |
| 10 | Output Ready O_RDY |
| 11 | Output Active O_ACT |
| 12 | Setup Active S_ACT |
| 13 | Output Isochronous Idle OS_IDL |
| 14 | Output Isochronous Ready OS_RDY |
| 15 | Output Isochronous Active OS_ACT |

In a preferred embodiment, only one endpoint pipe is active at any given time.

In a preferred embodiment, the buffer page A register BPA is a double-word, read/write register. The upper 21 bits of BPA define a 2K byte page in which buffers for data transfer are defined. This buffer page is determined by the buffer page select bit value in the control word CW.BP written in memory in the endpoint array. On reset, this register is cleared. The BPA register format is as follows:

| Bits | Function Label |
| --- | --- |
| 31–11 | BPA |
| 10–0 | 00000000000 |

In a preferred embodiment, the buffer page B register BPB is a double-word read/write register. The upper 21 bits of BPB define a 2K byte page in which buffers for data transfer are defined. This buffer page is determined by the buffer page select bit value in the control word CW.BP written in memory in the endpoint array. On reset, this register is cleared. The BPB register format is as follows:

| Bits | Function Label |
| --- | --- |
| 31–11 | BPB |
| 10–0 | 00000000000 |

Endpoint Pipe States

In a preferred embodiment, an endpoint can have the following states. To maintain operation and control, each endpoint pipe maintains a state with well-defined conditions for transferring between the state that involves an implicit hardware/software synchronization. Endpoint pipe state transitions occur:

on explicit software commands to an endpoint through the endpoint command register ECR;

by reading the buffer status of the other buffer in the other control word for this endpoint at the end of a transfer; and as a result of events on USB such as receipt of IN, OUT and SETUP tokens and ACK handshakes.

Figure 6:
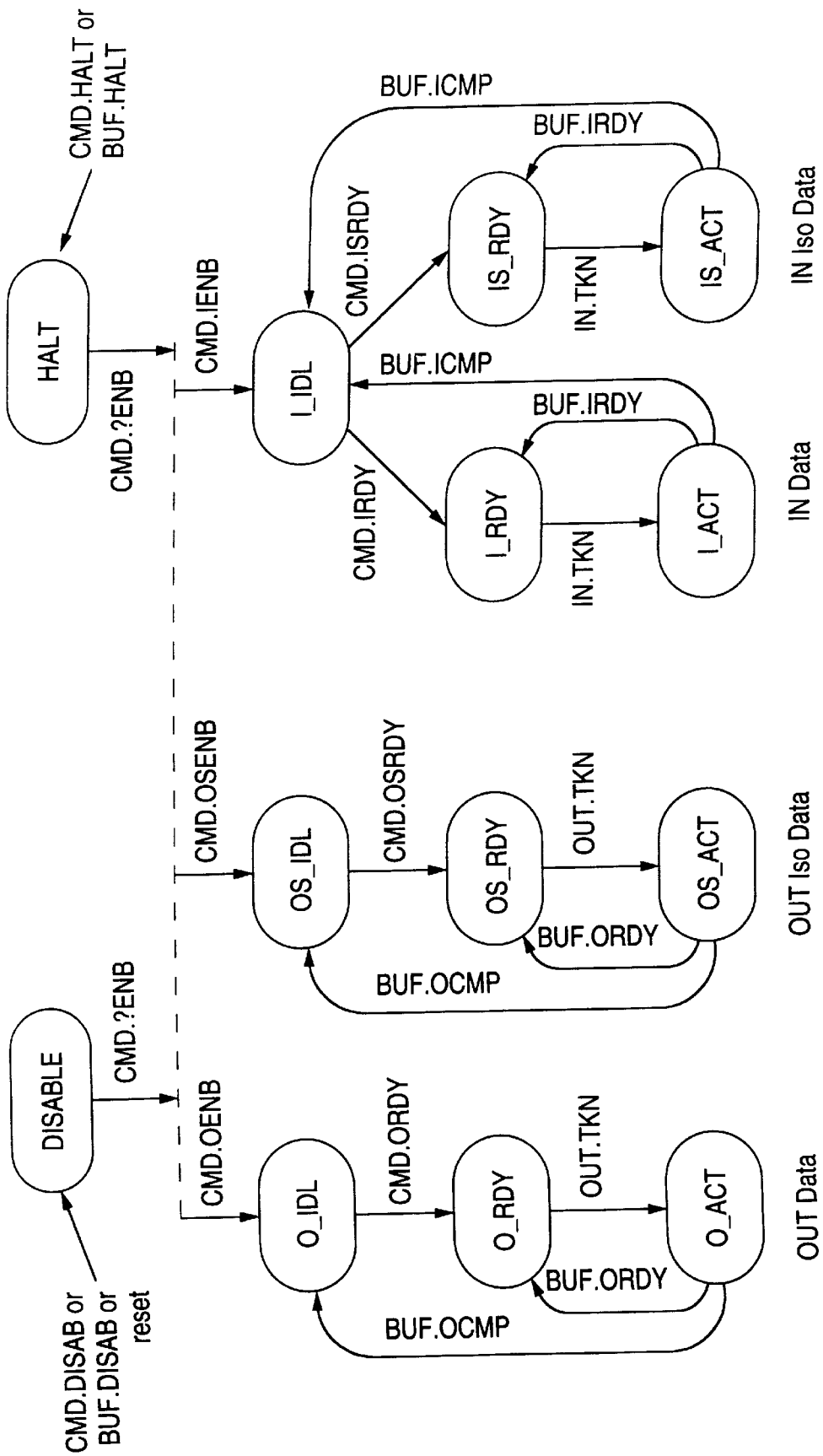
FIG. 6 is a state diagram corresponding to a preferred embodiment of the present invention.

FIG. 6 shows the simplified endpoint pipe state machine for handling of IN and OUT transactions. Handling of control read and control write transactions are handled in a similar manner.

The current endpoint pipe state is visible in the endpoint state register, which is accessible through the USB Index and Data registers. In a preferred embodiment, at most one endpoint pipe is ever in any of the Active states at any given time. This allows sharing of the Active state logic among all of the endpoint pipes.

An endpoint pipe can have the following states, as shown in FIG. 6:

Disable. The DISABLE state is entered upon reset, upon the disable command to this endpoint pipe, and upon detection of a disable state in the buffer state of a control word. Any token received to this endpoint pipe while in this state is returned with no handshake. Software intervention is required to remove the endpoint pipe from this state, typically through an enable command to one of the Idle states.

Halt. The HALT state is entered upon the stall command to this endpoint pipe, upon detection of a stall state in the buffer state of a control word, and upon certain error conditions. Any token received to this endpoint pipe while in this state is returned a STALL handshake to indicate that the endpoint is currently stalled. Software intervention is required to remove the endpoint pipe from this state, typically through an enable command to one of the Idle states.

Input Idle I_IDL. In this state, the endpoint expects that a buffer will soon be allocated. A NAK handshake is returned in response to an IN token mapped to this endpoint pipe. No response is returned for OUT tokens from this endpoint pipe.

Input Ready I_RDY. This state is entered via an Input Ready command to this endpoint pipe or upon detection of another Input buffer at the end of a transfer. The command should only be given after a buffer has been allocated to this endpoint by writing the control word at the appropriate location in the endpoint array. This control word should point to a data buffer with data to return to the host in response to the next IN token received to this endpoint pipe. The PID value is transmitted as DATA0 when CWP is 0 and DATA1 when CWP is 1.

Input Active I_ACT. This state is entered upon receipt of an IN token when the selected endpoint state is currently Input Ready. While in this state, data is transferred from memory to the USB. Upon completion of the data transfer, an ACK handshake should be received within 16 bit times. At the end of this time-out period, if an ACK was not received, the buffer wait status is written back to the control word. However, the address and byte counter are not overwritten because a retransmission will occur and the current values need to be used again. If an ACK is received, the buffer status along with the current value of the address and byte counter are written. Then the other control word on this endpoint is read to determine the next state of the endpoint to be used the next time a token is directed to this endpoint pipe. If this endpoint is being used for a control transfer a transfer to the output Ready or Output Idle state can occur to complete the status phase of a control read transfer.

Input Isochronous Ready IS_RDY. This state is entered via an Input Ready command to this endpoint pipe or upon detection of another Input buffer at the end of a transfer. The command should only be given after a buffer has been allocated to this endpoint by writing the Control Word at the appropriate location in the Endpoint Array. This control word should point to a data buffer with data to return to the host in response to the next IN token received to this endpoint pipe. The PID value is always transmitted as DATA0 independent of the value of CWP.

Input Isochronous Active IS_ACT. This state is entered upon receipt of an IN token when the selected endpoint state is currently Input Ready. While in this state data is transferred from memory to the USB. Upon completion of the data transfer, the buffer status along with the current value of the address and byte counter are written at the end of the transfer. Then the other control word on this endpoint is read to determine the next state of the endpoint to be used the next time a token is directed to this endpoint pipe.

Output Idle O_IDL. In this state, the endpoint expects that a buffer will soon be allocated. A NAK handshake is returned in response to an OUT token mapped to this endpoint pipe. No response is returned for IN tokens on this endpoint pipe.

Output Ready O_RDY. This state is entered after this endpoint pipe has been given a buffer in which to write data. This can be entered via an Output Ready command from the O_IDL state after the appropriate word in the endpoint array is written, or upon detection of another Output buffer at the end of a transfer.

Output Active O_ACT. This state is entered upon receipt of an OUT token. While in this state data from the USB is written to memory. At the end of an output transfer, status is written to the control word at CWP. If the transfer was not successful, i.e., a CRC or bit stuffing error was detected, this is written as the buffer status. If the transfer was successful, the output complete buffer status is written, CWP is inverted, and the other control word for this endpoint pipe is read. The appropriate transition is made based on the buffer state. If this endpoint is being used for a control transfer, a transfer to the Input Ready or Input Idle state can occur to complete the status phase of a control write transfer.

Output Isochronous Idle OS_IDL. In this state, the endpoint expects that a buffer will soon be allocated. No handshake is returned in response to an OUT token mapped to this endpoint pipe. No data or handshake is returned for IN tokens on this endpoint pipe.

Output Isochronous Ready OS_RDY. This state is entered after this endpoint pipe has been given a buffer in which to write data. This can be entered via an OSRDY command from the OS_IDL state after the appropriate word in the endpoint array is written, or upon detection of another Output buffer at the end of a transfer.

Output Isochronous Active OS_ACT. This state is entered upon receipt of an OUT token from the OS_RDY state. While in this state, data from the USB is written to memory. At the end of an output transfer, status is written to the control word at CWP. If the transfer was not successful, i.e., a CRC or bit stuffing error was detected, this is written as the buffer status. If the transfer was successful, the output complete buffer status is written. At the end of the status transfer, CWP is inverted, and the other control word for this endpoint pipe is read. The appropriate transition is made based on the buffer state.

Setup Ready S_RDY. This state is entered after this endpoint pipe has been given a buffer in which to write data. This state is entered by a setup ready command after the appropriate word in the endpoint array is written, or upon detection of the setup ready buffer state.

Setup Active S_ACT. This state is entered upon receipt of a SETUP token from the Setup Ready state. While in this state, data from the USB is written to memory. At the end of an output transfer, status is written to the control word at CWP, the CWP is inverted, and the other control word for this endpoint pipe is read. The appropriate transition is made based on the buffer state to the output idle, output ready, input idle, or input ready state depending on the type of control transfer and the buffer state read.

After reset, all of the endpoints are disabled. An endpoint is enabled by giving an enable command to an endpoint.

This should only be done when input and/or output buffers will soon be allocated to this endpoint. All endpoints not currently mapped to an endpoint pipe are considered disabled.

Software allocates buffers to endpoints pipes on an as needed basis. After each buffer is allocated, it performs the input or output ready command on the endpoint pipe. If the endpoint pipe is currently in the Idle state, it enters the appropriate ready state. If the endpoint pipe is currently in a ready or active state, it ignores all commands except disable and stall commands to the endpoint pipe, which it handles immediately. Software must do this write in order to avoid potential synchronization problems since the UNIM endpoint pipe handling is asynchronous to the software operations.

Since up to two buffers can be allocated to each endpoint, the next buffer can be prepared while the current one is being processed to speed the data transfer and avoid unnecessary NAK handshakes.

Bulk Endpoint Operation

In a preferred embodiment, bulk endpoints operate similarly to the interrupt endpoints, except that typically larger data transfers are involved and they occur in both the IN and OUT directions. The toggle protocol is always followed for bulk endpoints, so in all control words, TE is set. A particular bulk endpoint is used in either the Input or Output direction. When a bulk endpoint is first initialized, an input enable or output enable command is given to the appropriate endpoint pipe number (ECR.(I/OENB,EPN)).

For endpoints used for input, when data is available, it is written to a buffer, a control word is written with an IRDY state, and TE is set. Then an IRDY command is performed. At most, two buffers of data can be pending on an endpoint pipe at any given time. This allows a double-buffer scheme if necessary to avoid sending any NAKs during a large data transfer. Software synchronization occurs by examining the buffer state. Only the complete buffer states can be overwritten.

For endpoints used for output, a buffer must be prepared in which to transfer the data. When this buffer is available, a control word with a pointer to it is written into the appropriate control word. The toggle enable bit TE should also be set here. An ORDY command is given to the endpoint pipe. After data has been received to this buffer as part of the OUT token, the control word in memory is updated. If the size of the data packet is not known, the buffer rounding bit of the control word should be set. This allows packets smaller than the buffer size to be received and no error status is written. If the buffer rounding bit is not set, then packets received that do not exactly fill the allocated buffer are written with a data error status error. In all cases the data status error is written if more data than expected was received for this endpoint. If an error is detected during reception of this data, an intermediate buffer state is written back to memory, and on the next OUT token the buffer is used again. This means that the software only needs to be concerned with providing buffers in which to receive the data, not with the intricacies of the retry protocol.

To summarize, in a preferred embodiment, the endpoint pipe controller performs the following steps. First, based on the current EPP state, the ECR is updated. The ECR can cause one endpoint pipe's state to be updated while another endpoint pipe remains active.

Next, the endpoint receives a token. The address is compared against the functional address, the endpoint number EPN is used as an index into the endpoint pipe map, and the received endpoint pipe number is determined. The buffer state variable keeps track of the current state of the buffer. The buffer state can be updated at three times during a transaction and the remaining value is then written back to the control word. This value may be overwritten later by a more correct status.

Next, the endpoint reads a control word in response to the token. The phase 1 buffer state is set to IWT or OWT. In these cases the control word is read from memory and is then used to determine whether to start a data transfer, using the address and size defined in the control word. The next value of the buffer state is also determined. This is used to overwrite the buffer state as earlier set. If an IN token was received, data at the address is read and transferred to the USB. If an OUT or SETUP token was received, once 32 bits of data have been received from the USB, a data transfer is started at the address from the control word.

Next, at the end of the transfer, the buffer state and handshake HS are updated. When a request is made to update the control word at EABAR+cEPP+CWP, BS and HS are updated immediately.

When the last byte of the IN packet is sent, a timer to wait for the returning ACK is started. A timeout is signaled if an ACK is not received within 16 bit times from when the end-of-packet was sent. This value can be increased to account for pipeline delays. A buffer error occurs when data cannot be fetched fast enough to keep up with the USB transfer rate, and an underflow condition occurs.

At the end of an OUT packet, the end-of-write signal EOW is asserted when the last expected byte is transferred from the endpoint controller. A buffer error occurs when data could not be written to memory fast enough and an overflow occurs. A data error occurs when there is a data overflow or a rounding error. Data overflow occurs when the received packet is bigger than the allocated buffer, i.e., a byte was received after EOW is asserted. A rounding error occurs when buffer rounding CW.BR is not set and the buffer count at the beginning of the CRC is non-zero (i.e., the packet did not exactly fill the buffer).

Finally, the endpoint pipe state for this endpoint pipe is updated. If the CWP is incremented, the next endpoint pipe state comes from the new control word that is read immediately after the CWP is incremented (inverted).

It should be understood that various alternatives to the embodiments of the invention described herein may be employed in practicing the invention. It is intended that the following claims define the scope of the invention and that structures within the scope of these claims and their equivalents are covered thereby.

What is claimed is:

1. An apparatus for sending data on a non-isochronous endpoint pipe from a Universal Serial Bus (USB) endpoint to a USB host, comprising:
   at least one data storage element configured to store data and being shared among a plurality of USB endpoints;
   a data processor configured to generate data;
   a pointer data storage element configured to store a pointer corresponding to one of a plurality of buffers in said at least one data storage element; and
   a controller configured to send a plurality of data from said plurality of USB endpoints to at least one USB host on at least one USB endpoint pipe, and to receive a signal,
   wherein said data processor generates a first plurality of data in a first buffer of said plurality of buffers and a second plurality of data in a second buffer of said plurality of buffers, and said controller generates in said pointer data storage element a first pointer to said first buffer, sends said first plurality of data as indicated by said pointer data storage element, then receives a first signal being one of a host signal from said at least one USB host and a timeout signal, wherein said controller resends said first plurality of data until said host signal is received, and wherein once said host signal is received, said controller generates in said pointer data storage element a second pointer to said second buffer and sends said second plurality of data as indicated by said pointer data storage element.

2. The apparatus of claim 1, wherein said at least one USB endpoint pipe is 16 USB endpoint pipes, and said plurality of USB endpoints is 16 USB endpoints.

3. The apparatus of claim 1, wherein said plurality of buffers are a double buffer.

4. The apparatus of claim 1, wherein said host signal is an acknowledgement signal.

5. An apparatus for sending data on a non-isochronous endpoint pipe from a Universal Serial Bus (USB) endpoint to a USB host, comprising:

at least one data storage element configured to store data and being shared among a plurality of USB endpoints;

a data processor configured to generate data;

a pointer data storage element configured to store a pointer corresponding to one of a plurality of buffers in said at least one data storage element; and a controller configured to send a plurality of data from said plurality of USB endpoints to at least one USB host on at least one USB endpoint pipe, and to receive a signal, wherein said data processor generates a first plurality of data in a first buffer of said plurality of buffers and a second plurality of data in a second buffer of said plurality of buffers, and said controller generates in said pointer data storage element a first pointer to said first buffer, sends said first plurality of data as indicated by said pointer data storage element, then receives a first signal being one of a host signal from said at least one USB host and a timeout signal, wherein said controller resends said first plurality of data until said host signal is received, wherein once said host signal is received, said data processor generates a third plurality of data in said first buffer, and said controller generates in said pointer data storage element a second pointer to said second buffer, sends said second plurality of data as indicated by said pointer data storage element, then receives a second signal being one of a second host signal from said at least one USB host and a second timeout signal, wherein said controller resends said second plurality of data until said second host signal is received, and wherein once said second host signal is received, said controller generates in said pointer data storage element a third pointer to said first buffer and sends said third plurality of data as indicated by said pointer data storage element.

6. The apparatus of claim 5, wherein said at least one USB endpoint pipe is 16 USB endpoint pipes, and said plurality of USB endpoints is 16 USB endpoints.

7. The apparatus of claim 5, wherein said plurality of buffers are a double buffer.

8. The apparatus of claim 5, wherein said host signal is an acknowledgement signal, and wherein said second host signal is a second acknowledgement signal.

9. A method of sending data on a non-isochronous endpoint pipe from a Universal Serial Bus (USB) endpoint to a USB host, comprising the steps of:

generating a first plurality of data in a first buffer of a plurality of buffers shared among a plurality of USB endpoints, generating a first pointer corresponding to said first buffer, and storing said first pointer in a pointer data storage element;

generating a second plurality of data in a second buffer of said plurality of buffers;

sending said first plurality of data, as indicated by said pointer data storage element, from a USB endpoint to a USB host, then receiving a signal being one of a host signal from said USB host and a timeout signal;

resending said first plurality of data until said host signal is received; and once said host signal is received, generating a second pointer corresponding to said second buffer, storing said second pointer in said pointer data storage element, then sending said second plurality of data, as indicated by said pointer data storage element, from said USB endpoint to said USB host.

10. A method of sending data on a non-isochronous endpoint pipe from a USB endpoint to a USB host, comprising the steps of:

generating a first plurality of data in a first buffer of a plurality of buffers shared among a plurality of USB endpoints, generating a first pointer corresponding to said first buffer, and storing said first pointer in a pointer data storage element;

generating a second plurality of data in a second buffer of said plurality of buffers;

sending said first plurality of data, as indicated by said pointer data storage element, from a USB endpoint to a USB host, then receiving a signal being one of a host signal from said USB host and a timeout signal;

resending said first plurality of data until said host signal is received;

once said host signal is received, generating a second pointer corresponding to said second buffer, storing said second pointer in said pointer data storage element, generating a third plurality of data in said first buffer, then sending said second plurality of data, as indicated by said pointer data storage element, from said USB endpoint to said USB host, then receiving a second signal being one of a second host signal and a second timeout signal, resending said second plurality of data until said second host signal is received; and once said second host signal is received, generating a third pointer corresponding to said first buffer, storing said third pointer in said pointer data storage element, then sending said third plurality of data, as indicated by said pointer data storage element, from said USB endpoint to said USB host.

11. An apparatus for sending and receiving data on a non-isochronous endpoint pipe at a Universal Serial Bus (USB) endpoint from a USB host, comprising:

at least one data storage element configured to store data and being shared among a plurality of USB endpoints;

a data processor configured to generate data;

a pointer data storage element configured to store a pointer corresponding to one of a plurality of buffers in said at least one data storage element; and a controller configured to send/receive a plurality of data from/at said plurality of USB endpoints to/from at least one USB host on at least one USB endpoint pipe, wherein when receiving:

said controller writes into said pointer data storage element a first pointer corresponding to a first buffer of said plurality of buffers, receives a first plurality of data into said first buffer as indicated by said pointer data storage element, writes into said pointer data storage element a second pointer corresponding to a second buffer of said plurality of buffers, and receives a second plurality of data into said second buffer as indicated by said pointer data storage element; and wherein when sending:

said data processor generates a third plurality of data in a third buffer of said plurality of buffers and a fourth plurality of data in a fourth buffer of said plurality of buffers, and said controller generates in said pointer data storage element a third pointer to said third buffer, sends said third plurality of data as indicated by said pointer data storage element, then receives a first signal being one of a host signal from said at least one USB host and a timeout signal, said controller resends said third plurality of data until said host signal is received, and once said host signal is received, said controller generates in said pointer data storage element a fourth pointer to said forth buffer and sends said fourth plurality of data as indicated by said pointer data storage element.

12. The apparatus of claim 11, wherein said controller is further configured to detect an error, and wherein when said controller detects said error, said controller continues receiving without writing another pointer until said error is handled.

13. The apparatus of claim 12, wherein said error is one of a CRC error, a bit stuff error, and a buffer error.

14. The apparatus of claim 11, wherein said at least one USB endpoint pipe is 16 USB endpoint pipes, and said plurality of USB endpoints is 16 USB endpoints.

15. The apparatus of claim 11, wherein said plurality of buffers are a double buffer.

16. The apparatus of claim 11, wherein said host signal is an acknowledgement signal.

17. An apparatus for sending and receiving data on a non-isochronous endpoint pipe at a Universal Serial Bus (USB) endpoint from a USB host, comprising:

at least one data storage element configured to store data and being shared among a plurality of USB endpoints;

a data processor configured to generate data;

a pointer data storage element configured to store a pointer corresponding to one of a plurality of buffers in said at least one data storage element; and a controller configured to receive a plurality of data at said plurality of USB endpoints from at least one USB host on at least one USB endpoint pipe, when receiving:

said controller writes into said pointer data storage element a first pointer corresponding to a first buffer of said plurality of buffers, receives a first plurality of data into said first buffer as indicated by said pointer data storage element, writes into said pointer data storage element a second pointer corresponding to a second buffer of said plurality of buffers, receives a second plurality of data into said second buffer as indicated by said pointer data storage element, writes into said pointer data storage element a third pointer corresponding to said first buffer, and receives a third plurality of data into said first buffer as indicated by said pointer data storage element; and wherein when sending:

said data processor generates a fourth plurality of data in a third buffer of said plurality of buffers and a fifth plurality of data in a fourth buffer of said plurality of buffers, and said controller generates in said pointer data storage element a fourth pointer to said third buffer, sends said fourth plurality of data as indicated by said pointer data storage element, then receives a first signal being one of a host signal from said at least one USB host and a timeout signal, said controller resends said fourth plurality of data until said host signal is received, once said host signal is received, said data processor generates a sixth plurality of data in said third buffer, and said controller generates in said pointer data storage element a fifth pointer to said fourth buffer, sends said fifth plurality of data as indicated by said pointer data storage element, then receives a second signal being one of a second host signal from said at least one USB host and a second timeout signal, said controller resends said fifth plurality of data until said second host signal is received, and once said second host signal is received, said controller generates in said pointer data storage element a sixth pointer to said third buffer and sends said sixth plurality of data as indicated by said pointer data storage element.

18. The apparatus of claim 17, wherein said controller is further configured to detect an error, and wherein when said controller detects said error, said controller continues receiving without writing another pointer until said error is handled.

19. The apparatus of claim 18, wherein said error is one of a CRC error, a bit stuff error, and a buffer error.

20. The apparatus of claim 17, wherein said at least one USB endpoint pipe is 16 USB endpoint pipes, and said plurality of USB endpoints is 16 USB endpoints.

21. The apparatus of claim 17, wherein said plurality of buffers are a double buffer.

22. The apparatus of claim 17, wherein said host signal is an acknowledgement signal.

23. A method of sending and receiving data on a non-isochronous endpoint pipe at a Universal Serial Bus (USB) endpoint from a USB host, comprising the steps of:

generating a first pointer corresponding to a first buffer of a plurality of buffers shared among a plurality of USB endpoints, and storing said first pointer in a pointer data storage element;

receiving a first plurality of data from a USB host into said first buffer as indicated by said pointer data storage element;

generating a second pointer corresponding to a second buffer of said plurality of buffers, and storing said second pointer in said pointer data storage element;

receiving a second plurality of data into said second buffer as indicated by said pointer data storage element;

generating a third plurality of data in a third buffer of said plurality of buffers, generating a third pointer corresponding to said third buffer, and storing said third pointer in said pointer data storage element;

generating a fourth plurality of data in a fourth buffer of said plurality of buffers;

sending said third plurality of data, as indicated by said pointer data storage element, from a USB endpoint to said USB host, then receiving a signal being one of a host signal from said USB host and a timeout signal;

resending said third plurality of data until said host signal is received; and once said host signal is received, generating a fourth pointer corresponding to said fourth buffer, storing said fourth pointer in said pointer data storage element, then sending said fourth plurality of data, as indicated by said pointer data storage element, from said USB endpoint to said USB host.

* * * * *

UNITED STATES PATENT AND TRADEMARK OFFICE
CERTIFICATE OF CORRECTION

PATENT NO.: 6,173,355 B1
DATED: January 9, 2001
INVENTOR: OHAD FALIK et al.

It is certified that two errors appear in the above-identified patent and that said Letters Patent is hereby corrected as shown below:

In Column 21, line 29, "forth" should be --fourth--.

In Column 21, line 59, "when" should be --wherein when--.

Signed and Sealed this

Twenty-ninth Day of May, 2001

*Attest:*

NICHOLAS P. GODICI

*Attesting Officer*  *Acting Director of the United States Patent and Trademark Office*